Aug. 28, 1928.
G. ZIEGLER
1,682,260
PHOTOGRAPHIC CAMERA
Filed May 14, 1925
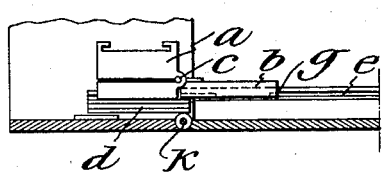
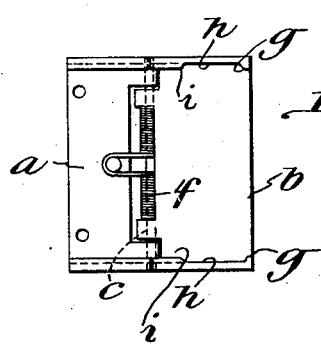
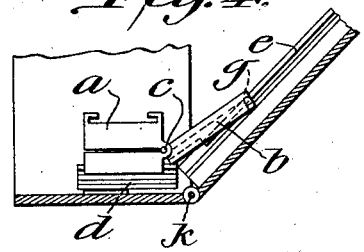
Inventor
Gustav Ziegler,
By Byrnes Townsend & Brickenstein,
Attorneys.

Patented Aug. 28, 1928.

1,682,260

UNITED STATES PATENT OFFICE.

GUSTAV ZIEGLER, OF MUNICH, GERMANY, ASSIGNOR TO A. HCH. RIETZSCHEL, G. M. B. H., OF MUNICH, GERMANY.

PHOTOGRAPHIC CAMERA.

Application filed May 14, 1925, Serial No. 30,317, and in Germany June 26, 1924.

This invention relates to folding cameras in which the lens carrier is slidable in a guide at the bottom of the frame of the camera.

In the usual construction when the camera is shut the rear portion carrying the lens carrier leaves the guide and can oscillate freely in the housing. When closing the camera the lens carrier can fall and damage the casing.

It has also been proposed to allow the lens carrier to remain in a guide in the camera, while the front portion slides, being guided only by side guides.

According to this invention there is hinged to the lens carrier a flanged member whose flanges are cut away for a portion thereof to allow the flanges to separate from guides carried by the folding bed of the camera during the closing of the camera except at the two points remote from the hinge.

It will be seen that the lens carrier will only slide and not move up or down.

When the camera is open both the lens carrier and the hinged member are in their guides and can easily be moved out.

The invention is illustrated in the accompanying drawing, in which Figure 1 is a longitudinal section of a portion of the camera when open, Figure 2 is a section and Figure 3 is an underside view of the lens carrier and the part hinged thereto in their open position. Figure 4 is a longitudinal section showing the camera in the act of being closed.

Referring to the drawings, $a$ is the lens carrier, $d$ a fixed guide in which engage downwardly extended portions of carrier $a$. $b$ is a plate connected to the lens carrier $a$ by means of a pivot joint $c$ and urged by spring $f$ into a horizontal position. Plate $b$ is flanged on two sides and the flanged portions cut away at $h$ to provide at the ends remote from the pivot joint $c$ laterally extending projections $g$ which engage with guide $e$ on the camera bed which is hinged at $k$.

The pin-like projections $g$ extend under portions of guide members $e$ or into laterally disposed slideways formed therein, and are in alinement transversely of the guides. The cut-away sections $h$ of the lateral flanges stop short of the inner edge of the plate $b$ to leave members $i$ which, when the lens carrier is drawn forward, engage within the slideways of the guides $e$. When the lens carrier $a$ is at its inner position, the members $i$ do not engage with either the fixed guide $d$ or the guide $e$. The hinged bed of the camera may then be turned about the hinge $k$ and the plate $b$ turns about its pivot $c$ as the projections $g$ slide in the slideways of the guides $e$.

It will be seen that when the camera is open as shown in Figure 1, the plate $b$ is pressed by its spring into the horizontal position, in which position the lens carrier $a$ can easily be moved out, being guided both by the projections $g$ and by the flanged portions on plate $b$ near to the hinge.

When the camera is to be closed, the plate $b$ and the lens carrier are moved inwardly to their innermost position indicated in Fig. 1 so that the flanged portions of the plate $b$ are out of engagement with the guide $e$. When the hinged bed is now moved to close the camera, the plate $b$ is entirely free from the guide $e$ except for the projections $g$ which act as pivot pins and thus accommodates itself to the angular movement of the hinged bed.

I claim:—

1. A camera of the type including a hinged side, providing a folding bed, a lens carrier, a fixed guide therefor permitting movement of the lens carrier at right angle to the hinge connection of the side, a guide on the hinged side and defining substantially a continuation of the fixed guide when the hinged side is entirely open and a member pivotally connected with the lens carrier, characterized by the fact that said member carries at its outer end laterally extending and transversely alined projections, and the guide on said hinged side has the form of laterally disposed slideways for receiving said projections.

2. Apparatus according to claim 1, wherein the said member has flanged portions near its pivot connection to the lens carrier, adapted to engage the guide slideways when the latter is entirely open and the lens carrier is moved outwardly from its innermost position.

3. In a camera having a hinged side providing a folding bed, the combination of a lens carrier, a fixed guide therefor permitting movement of the lens carrier toward the hinge connection of the side having laterally disposed slideways, a guide on the hinged side, defining a continuation of the fixed guide when the hinged side is entirely open and a plate member pivotally connected with the lens carrier, said plate member having laterally directed flanges for engagement with the guide slideways on the hinged side, portions of the flanges being cut away leaving pin-like projections at the free end of the plate member, whereby the latter, in one position, may have angular movement about the pin-like projections.

In testimony whereof I have hereunto set my hand.

GUSTAV ZIEGLER.